Sept. 15, 1959                H. B. REED, JR                2,904,739
          SYSTEM FOR CHARGING AND DISCHARGING A BATTERY PACK
Filed June 28, 1957                                    2 Sheets-Sheet 1
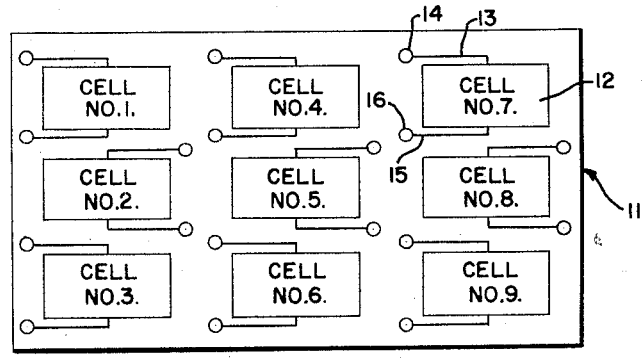
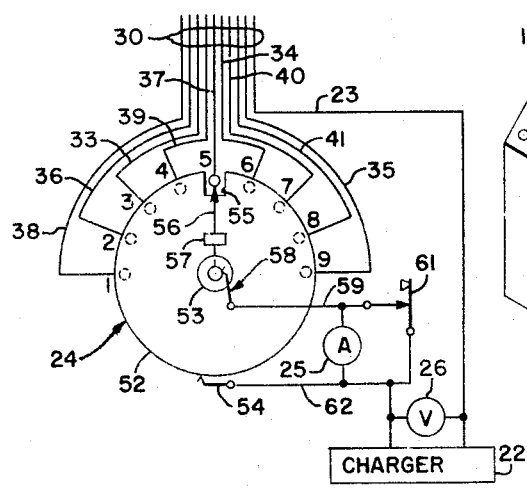
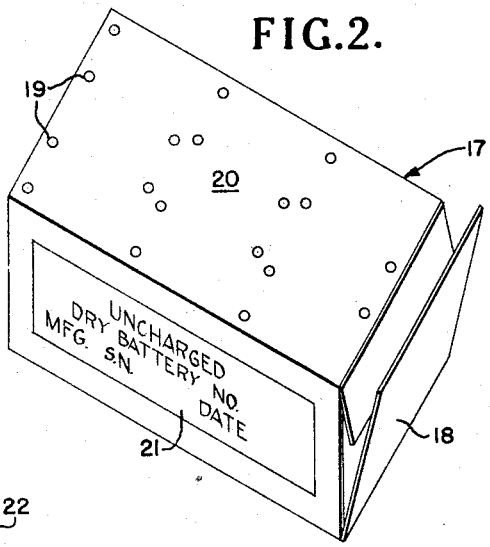
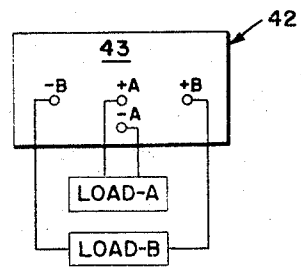
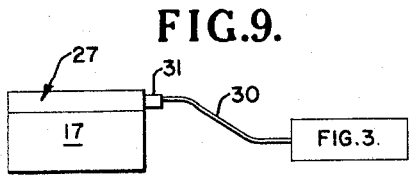
INVENTOR.
HERBERT B. REED JR.
BY
ATTYS Sept. 15, 1959        H. B. REED, JR        2,904,739
SYSTEM FOR CHARGING AND DISCHARGING A BATTERY PACK
Filed June 28, 1957        2 Sheets-Sheet 2
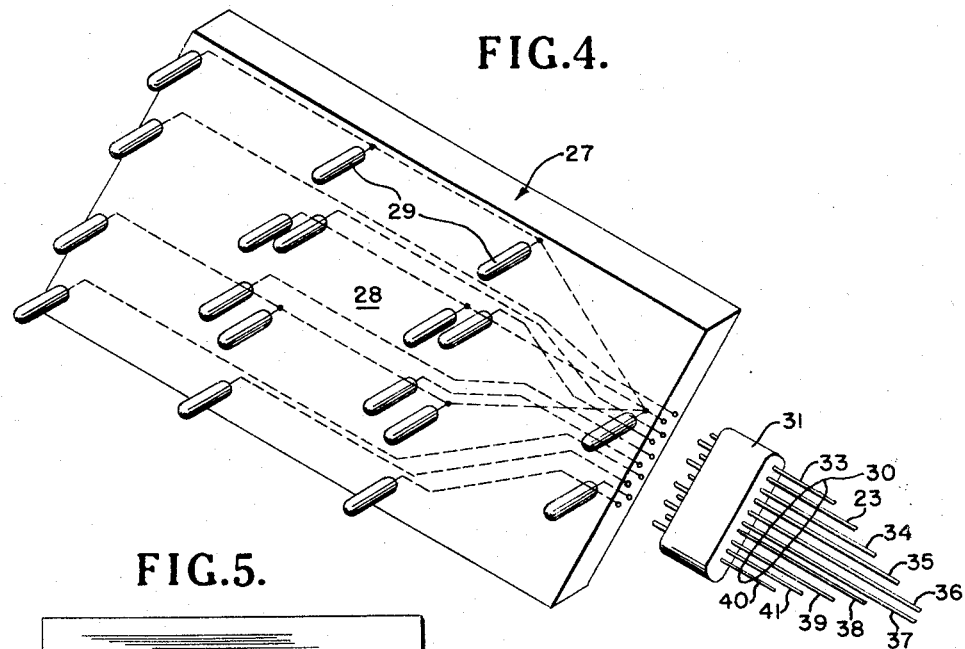
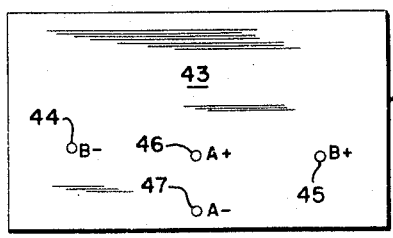
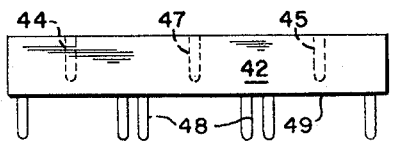
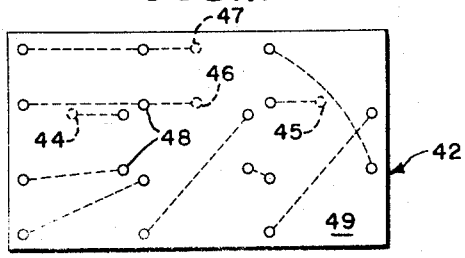
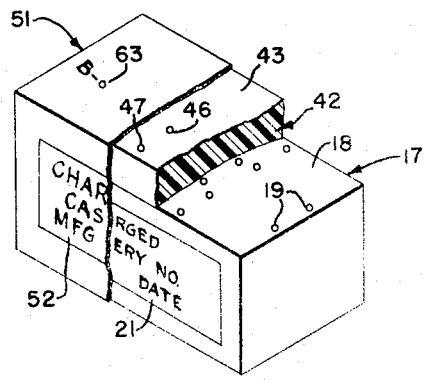
INVENTOR
HERBERT B. REED JR.
BY *G. W. O'Brien*
*W. O. Quackenbush*
ATTYS

United States Patent Office 2,904,739
Patented Sept. 15, 1959

2,904,739

SYSTEM FOR CHARGING AND DISCHARGING A BATTERY PACK

Herbert B. Reed, Jr., Silver Spring, Md., assignor to the United States of America as represented by the Secretary of the Navy Application June 28, 1957, Serial No. 668,836

2 Claims. (Cl. 320—7)

(Granted under Title 35, U.S. Code (1952), sec. 266)

The invention described herein may be manufactured and used by or for the Government of the United States of America for governmental purposes without the payment of any royalties thereon or therefor.

This invention relates to the charging and discharging of batteries and more particularly to a system including a chargeable or rechargeable battery construction permitting the charging in parallel of a multiplicity of cells comprising a battery pack with subsequent use in series or series-parallel discharging, and in which is provided means for indicating the charging current of any of the cells while the remaining cells are being charged.

At the present time, chargeable dry battery units or packs are used as a source of electrical energy for many applications in the field of ordnance or the like. When all of the battery cells are connected in a parallel arrangement the application is limited to only the potential of the loaded cells. On the other hand, a series or series-parallel arrangement of cells during the charging operation thereof has a limitation caused by the inability to charge the cells in series without having the unbalanced internal properties of the battery cells cause undercharging in some of the cells and overcharging, and even gassing, to occur in others. Obviously this series charging arrangement results in not only incomplete charging but also an unpredictable capacity once the cells are charged. Since the charge accepted by the cells cannot be accurately related to the useable charge delivered, the charged condition of the cells is not uniform. Thus, there is required complete testing of each new assembly of battery cells, even though the cells had previously been tested on numerous similar applications. Furthermore, the battery packs now in general use are so designed as to render a charged battery indistinguishable from an uncharged battery except by means of electrical measurements.

To overcome these difficulties and disadvantages the present invention provides a battery charging and discharging system which comprises a battery pack constructed in such a manner that each cell, or a group of cells, is connected initially by a detachable multicontact plug in a circuit allowing parallel access from the outside to each individual cell. This allows all cells to be charged to capacity by using a charging apparatus which includes a manually settable selector switch, an ammeter for measuring at will the current accepted by each selected cell during charging and a voltmeter for measuring the charging voltage. Once the charge is completed the detachable plug is removed and replaced by a terminal board or adaptor consisting of a wired or printed circuit plate which suitably connects the cells in series or series-parallel, as the case may be. This arrangement will thus provide a system in which the voltages and capacities of the charged battery may be arranged as desired for a specific application. The entire assembly can be easily and neatly packaged for ready identification and use.

An object of the present invention is to provide a system in which a battery pack of unconnected cells can be stored in an uncharged condition for a long period of time subsequent to which the cells may be charged in parallel by establishing connections thereto through a new and improved multicontact connector.

Another object is the provision of a system employing battery construction in which each cell thereof is normally unconnected and may be fully charged in parallel with the other cells and the degree of charge of each of the cells may be determined with accuracy.

A further object of the invention is to provide a charge and discharge system for a battery pack of unconnected cells in which new and improved means are employed for charging the cells in parallel, measuring the charging current of each of the cells selectively and reconnecting the charged cells to a plurality of output circuits.

A still further object of the invention is to provide a chargeable multi-cell battery pack and a system for the charge and discharge thereof which provides new and improved means for interconnecting the cells in parallel for charging and for interconnecting the cells in a different arrangement for discharges without employing the wiring skills normally required.

Still other objects and advantages will be apparent from the following description taken in connection with the accompanying drawings in which:

Fig. 1 is a diagrammatic plan view of a battery pack constructed in accordance with the present invention;

Fig. 2 is a perspective view of the uncharged dry battery as stored;

Fig. 3 is a diagrammatic view of the battery charging apparatus and the cell selecting switch therefor;

Fig. 4 is a perspective view showing the terminal board or multicontact plug and cable for charging the battery;

Fig. 5 is a plan view of an adaptor plate or multi-contact plug for establishing an electrical connection between the charged battery pack and the load circuits;

Fig. 6 is a side view of the adaptor plate shown in Fig. 5;

Fig. 7 is a bottom view of the adaptor plate;

Fig. 8 is a perspective view partially broken away of the charged battery pack and selected adaptor plate assembled, packaged and ready for use;

Fig. 9 is a diagrammatic view of the battery pack charging system; and

Fig. 10 is a diagrammatic view of a discharging system suitable for use with the battery pack of Fig. 9.

Referring now to the drawings wherein like reference characters designate like or corresponding parts throughout the several views, there is diagrammatically shown in Fig. 1 a battery pack generally designated by the numeral 11 containing a plurality of chargeable, hermetically sealed dry battery cells 12. In the illustrated embodiment in Fig. 1 nine such cells are shown but it is to be understood that the number of such cells may be greater or less in accordance with the general intended use of the battery pack. Each cell is in turn connected electrically by means of a wire 13 to a terminal receptacle 14 and by means of a second wire 15 to a second terminal receptacle 16, these receptacles forming the positive and negative terminals for the cell. These terminal receptacles or sockets are preferably of the socket type, the advantage of which will become more clearly apparent in the following description of the invention.

The arrangement of the cell units, connecting wires and terminal sockets as shown in Fig. 1 may be potted in a potting compound composed of resin, wax, pitch or the like or may be fabricated in a tray type structure as sometimes used in dry battery construction. While the location or pattern of the individual cell units within the battery pack is not limited to the illustration shown it is readily apparent that such an arrangement locates the terminal sockets 15 and 16 in a manner most convenient for establishing charging and discharging connections thereto. In the illustrated embodiment of the device, the terminal sockets are all located in one face of the battery although two or more faces could be used depending upon the intended end application of the battery.

As previously described and illustrated, the battery pack initially comprises a plurality of uncharged disconnected cell units 12. It is thus intended that the assembly 11 may be shipped and/or stored in an uncharged condition for long periods of time until it is desired to charge the battery for adaptation to a specific application.

For convenience and protection in the handling and storing of the uncharged basic unit 11, it is preferably housed in a punched type of jacket such as shown and designated generally by the numeral 17 in Fig. 2. This jacket or sleeve conforms with the shape of the basic unit and may be quickly slipped over the unit and the end flaps 18 thereof sealed. It will be seen from Fig. 2 that the upper face 20 of the jacket is provided with a plurality of receptacle holes 19 punched in the face of the jacket congruent with the terminal receptacles of the battery unit 11 contained therein. The receptacle holes 19 thus form the same pattern as do the terminal receptacles of the battery and permit access to these terminals without removing jacket 17 from the basic unit.

An appropriate label 21 is printed on the jacket or may be affixed thereto to clearly identify the unit and the uncharged condition thereof. Thus the user can readily identify the appropriate basic unit for his specific needs and will be cognizant of its uncharged condition without resorting to electrical measurement procedures.

When ready for use the uncharged battery pack may be charged with the apparatus in Fig. 3 and Fig. 4. A conventional battery charger 22 is shown in Fig. 3, a common feed line 23 connects one terminal of the charger with one terminal of each cell unit in the battery by way of cable 30 and multicontact plug 27, Fig. 4. The other terminal of charger 22 is connected by way of the selector switch 24 with the second terminal of each cell unit whereby all cells are charged in parallel. A selector switch generally designated 24 is included in the circuit to make possible the measuring, by means of an ammeter 25, the current accepted by each cell during the charging operation. A voltmeter 26 is provided for measuring the charging voltage.

The selector 24 comprises a circular conductive element 52 rotatable to different settings selectively by a knob 53 affixed thereto and adapted to simultaneously engage and make contact with all but one of the switch terminals 1–9 selectively in accordance with the setting of the selector switch. Means such as the brush 54 is provided for establishing an external circuit connection to the circular element 52. The circular element or shorting disc 52 is provided with a recessed portion 55 within which is disposed an end of a brush 56 carried by the disc 52 and insulated therefrom as by the element 57 in such manner that the brush 56 makes contact with a selected electrical contact, such as the contact 5 illustrated, selectively in accordance with the instant setting of the switch. An external circuit to the brush 56 is established by the brush and slip ring arrangement indicated generally at 58. The brush 58 is electrically connected by conductor 59 through the ammeter A designated by the numeral 25 and contact of switch or key 61. Conductor 62 connects brush 54 and the other terminal of ammeter A and key 61 to one terminal of voltmeter V, designated 26, and the charger 22. The contacts 1–9 of switch 24 are connected by conductors 33—41 of cable 30 to plug 31, Fig. 4, conductor 23 being also included in this cable and likewise connected to plug 31. An arrangement is thus provided in which the voltage from charger 22 is applied to each of the conductors 33—41, the return circuit therefor including conductor 23. The selector switch is employed to check the current flowing through any desired cell during the charging operation, it being merely necessary to set the selector to a desired setting corresponding to the number of the cell to be checked and thereafter opening key 61 thus removing the short circuit from ammeter 25 and causing the current flowing through the selected cell to be made manifest thereon.

Referring now to Fig. 4 of the drawings, there is shown thereon a charging terminal strip or plate 27 which provides a plug-in type connection for easy charging of the battery units in the pack. In the embodiment shown, a contact face 28 of the charging terminal strip has depending therefrom a plurality of male plugs 29 of appropriate conductive material. Each plug is independently embedded in terminal strip 27 which is preferably formed of plastic or the like. The terminal strip is electrically connected to the charging apparatus shown in Figs. 3 and 9 by means of cable 30. This cable, it will be recalled, contains the common feed line 23 and in this embodiment of the invention, nine other connecting wires designated in Fig. 4 as 33, 34, 35, 36, 37, 38, 39, 40 and 41. A plurality of plugs are also embedded in the body portion of the charging terminal strip 31 each being electrically connected at one end of the wires in cable 30.

As shown in Fig. 4 the depending male plugs 29 are arranged in a pattern similar to that of the receptacle holes 19 of the enclosure jacket 17 so that by pressing face 28 of the charging terminal strip to face 20 of the package (Fig. 2) the depending male plug members will penetrate the jacket to engage the positive and negative terminal receptacles respectively of the battery assembly. Thus connecting wire 33 acting in conjunction with the common feed line 23 complete the circuit to cell number 3 while the common feed line 23 cooperates with connecting wire 34 to connect cell number 6, and so on, whereby each cell is connected in parallel to the charging apparatus. When the battery has become charged, multicontact plug 27 is removed therefrom and replaced by connector 42 which adapts the charged battery to a particular application. The adapter plate is composed of insulating material suitable for the purpose and shown here for purposes of illustration only since an adapter could be designed to meet the circuitry problem of any intended use. In this modification Fig. 5 shows the upper surface 43 of the adapter as being provided with two pairs of female terminal receptacles of the socket type. Sockets 45 and 44 form the positive and negative terminals for one circuit to be used and sockets 46 and 47 form terminals for a second circuit. These terminals may, if desired, be suitably designated to indicate the circuits associated therewith.

Referring now to Fig. 6 of the drawings illustrating a side view of the adapter plate 42 there is shown thereon a plurality of depending male plug members designated 48 which are equal in number and similarly located as the plug members 29 shown in conjunction with the charging terminal plate 27.

For purpose of illustration, the adapter plate may be internally wired as shown in Fig. 7 so that cells 3 and 6 of the battery pack cooperate in parallel to form one circuit leading to terminals 46 and 47. Cells 1, 2, 4, 5, 7, 8 and 9 are joined in series by their respective associated plug members and connecting wires to form a second circuit defined by the terminal receptacles 44 and 45. Thus the battery pack now represents a fabricated source of electrical energy which will satisfy the requirements of two circuits related to particular applications.

A convenient and usable form of the completed assembly is shown in Fig. 8. With the bottom face 49 of the adapter or circuit plate 42 pressed against the upper face of the battery package, the depending male plugs 48 fit into the receptacle holes 19 and engage the sockets 14 and 16 of the cells of the package leaving only the adapter plate receptacles 44, 45, 46 and 47, Fig. 5, exposed from the exterior. The battery pack could be used in this manner or more conveniently could be inserted into a larger jacket 51 having apertures 63 aligned with receptacles 44—47 of connector 42 and on which the identity, charging date, etc., could be suitably identified as shown at 52 in Fig. 8. Each of the apertures 63, if desired, may be provided with a suitable label or marking to indicate the circuit and voltage associated therewith. For example, when employing the adapter of Figs. 5–7, apertures 63 associated with receptacle 44 may be designated B— and aperture corresponding to the receptacle 45 may be designated B+. In like manner aperture associated with receptacle 46 may be designated A+ and the aperture associated with receptacle 47 may be designated A— and, if desired, the voltage of the battery at each of these pairs of circuits may be included in the marking information for these apertures.

In operation the battery pack which is employed with the system of the present invention is preferably initially fabricated of a plurality of dry cell units. This provides a universal basic battery which can be stored for any desired period in an uncharged condition. Quantities of the units can thus be shipped to remote points of use without regard to time delays and resultant changes of electrical characteristics. Subsequently when it is desired to put the battery unit to use in a specific ordnance or instrumentation application it is merely necessary for the unskilled operator to superimpose a standard charging terminal strip 27, which in this instance is so designed that its electrical connecting plugs 29 can be inserted in the exposed receptacle holes of a multi-cell battery such as the mine cell battery unit illustrated. The individual cell units can then be charged in parallel in a controlled manner with assurance that some cells will not be damaged by over voltage while others might have insufficient voltage to effect a proper charging as might be the case if the cell units were charged in parallel.

Once the battery is charged, it is only necessary to remove the charging plate and replace it with a particular adapter plate prefabricated and interconnected in accordance with the circuitry requirements of the intended application. The resultant package is then ready for immediate use by employing a connector plate having a pair of simple positive and negative terminal receptacles for each circuit to be used. Load —A, for example, may be connected to the —A and +A receptacles and load —B to the —B and +B receptacles by suitable pin jacks, or the like, and conductors connected thereto.

From the foregoing description it is apparent that the invention provides a universal or standard battery pack which can be stored in an uncharged condition for an indefinite time and subsequently charged and thus is well adapted to a specific application at the point of use. By charging each of the cell components of the battery pack in parallel there is assurance that the charging of each cell is controlled and thus damage or partially charging of individual units as a result of the charging operation is avoided. Performance of such a standard battery pack will thus be consistent and can be relied upon to accomplish its intended purpose. Obviously malfunctioning of ordnance equipment, for example, due to improper battery performance is not only costly but could be disastrous.

The extreme versatility of the battery pack is also quite obvious. A standard battery can be shipped out for generally universal use with on-the-spot adaptation to a specific application by the mere addition or insertion of an adapter, or circuit plate, specifically designed to meet the electrical requirements of the equipment with which the battery is to be used. Obviously, due to frequent changes in personnel, inadequacies of training programs, shortage of time in emergencies, etc., the use of packaged components requiring a minimum of skill and time has considerable advantage over more cumbersome and complex apparatus. Furthermore, the extreme simplification of design and suitability to marking and labeling makes the invention a more nearly foolproof component for field operation.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A battery charging system for charging multi-cell battery packs of the type formed by a plurality of unconnected dual-terminal cells having all the terminals disposed to define a terminal-socket panel consisting of a plurality of pairs of socket terminals arranged in predetermined pattern wherein each pair of socket terminals is connected to a respective one of said cells: said battery charging system comprising, in combination, a terminal board of insulation material having a plurality of pairs of projecting conductive plugs equal in number and conforming in pattern to the pairs of socket terminals of the battery jack panel and adapted for attachment thereto whereupon each pair of said plugs is in conductive engagement with a respective pair of said socket terminal pairs, a plurality of conductive receptacles carried by said board and exceeding the number of pairs of said plugs by one, conductive means carried by said board and interconnecting one of said receptacles to a plug of each pair of said plugs, the other plug of each pair of said plugs being connected to a respective one of the others of said receptacles, a cable having a plurality of conductors equal in number to said receptacles, a battery charger having two terminals, means for connecting one conductor of said cable between one terminal of said battery charger and said one receptacle, means for connecting one end of each of the other conductors of said cable to a respective one of said other receptacles, and a conductive assembly interconnecting the other end of said other conductors to the other terminal of said battery charger whereby said battery charging system is effective to charge the cells of the battery pack in parallel, said conductive assembly comprising a plurality of stationary contacts equal in number to the cells of the battery pack, each of said stationary contacts being connected to a respective one of said other conductors at said other end thereof, a rotatable conductive disc disposed in abutting relation with said stationary contacts and formed to selectively engage all of said stationary contacts simultaneously, and a conductive brush engaging said disc and connected to said other terminal of the battery charger.

2. The charging system of claim 1, wherein said conductive assembly further includes a recess formed in said disc and disposed to be selectively positioned in registry with any one of said stationary contacts, a conductive wiper insulatably mounted on said disc and extending into said recess to engage the stationary contact which is selectively in registry with said recess, a normally closed interruptable switch interconnecting said wiper with said other terminal of the battery charger, and an ammeter connected in shunt across said switch whereby interruption of said switch is effective to render said ammeter operable to indicate the charging current applied to the stationary contact in selective registry with said recess.

References Cited in the file of this patent

UNITED STATES PATENTS 2,335,526     Mitchell               Nov. 30, 1943